United States Patent [19]

Gustavsson

[11] 3,774,442
[45] Nov. 27, 1973

[54] PARTICLE SAMPLING DEVICES
[75] Inventor: Karl Axel Goran Gustavsson, Enkoping, Sweden
[73] Assignee: AB Bahco, Enkoping, Sweden
[22] Filed: Jan. 5, 1972
[21] Appl. No.: 215,514

[52] U.S. Cl. .................................................. 73/28
[51] Int. Cl. ............................................. G01n 1/02
[58] Field of Search ..................................... 73/28

[56] References Cited
UNITED STATES PATENTS
| 984,047 | 2/1911 | Touzalin | 73/28 |
| 2,468,021 | 4/1949 | Black | 73/28 X |

FOREIGN PATENTS OR APPLICATIONS
| 351,584 | 7/1931 | Great Britain | 73/28 |
| 158,137 | 1/1964 | U.S.S.R. | 73/28 |

Primary Examiner—James J. Gill
Attorney—Harold J. Birch et al.

[57] ABSTRACT

A device for taking a sample of particles from a flow of gas in a gas duct includes a handle carrying a front portion for insertion in said gas duct in the sampling operation, including a nose portion having an inlet opening for facing the gas flow, a through flow body through which extends a diffusor shaped channel extending from the inlet opening to a screen filter coupled to the down-stream end of said through flow body, and a valve including a cock inserted transversely in said diffusor channel and having an axis of rotation perpendicular to said diffusor channel and parallel to said handle. The handle carries an operating rod parallel to said valve cock rotation axis and connected between said valve cock and an operating knob on said handle for varying said cock between a first position providing no resistance to gas flow through said diffusor channel and a second position closing said diffusor channel to said gas flow. The handle further supports a first tube having an inlet in said diffusor channel between the inlet opening of said nose portion and said valve and an outlet providing a measure of static pressure of gas flow in said diffusor channel, and a second tube having an inlet in said front portion to said gas duct and an outlet providing a measure of static pressure in said gas duct.

9 Claims, 4 Drawing Figures

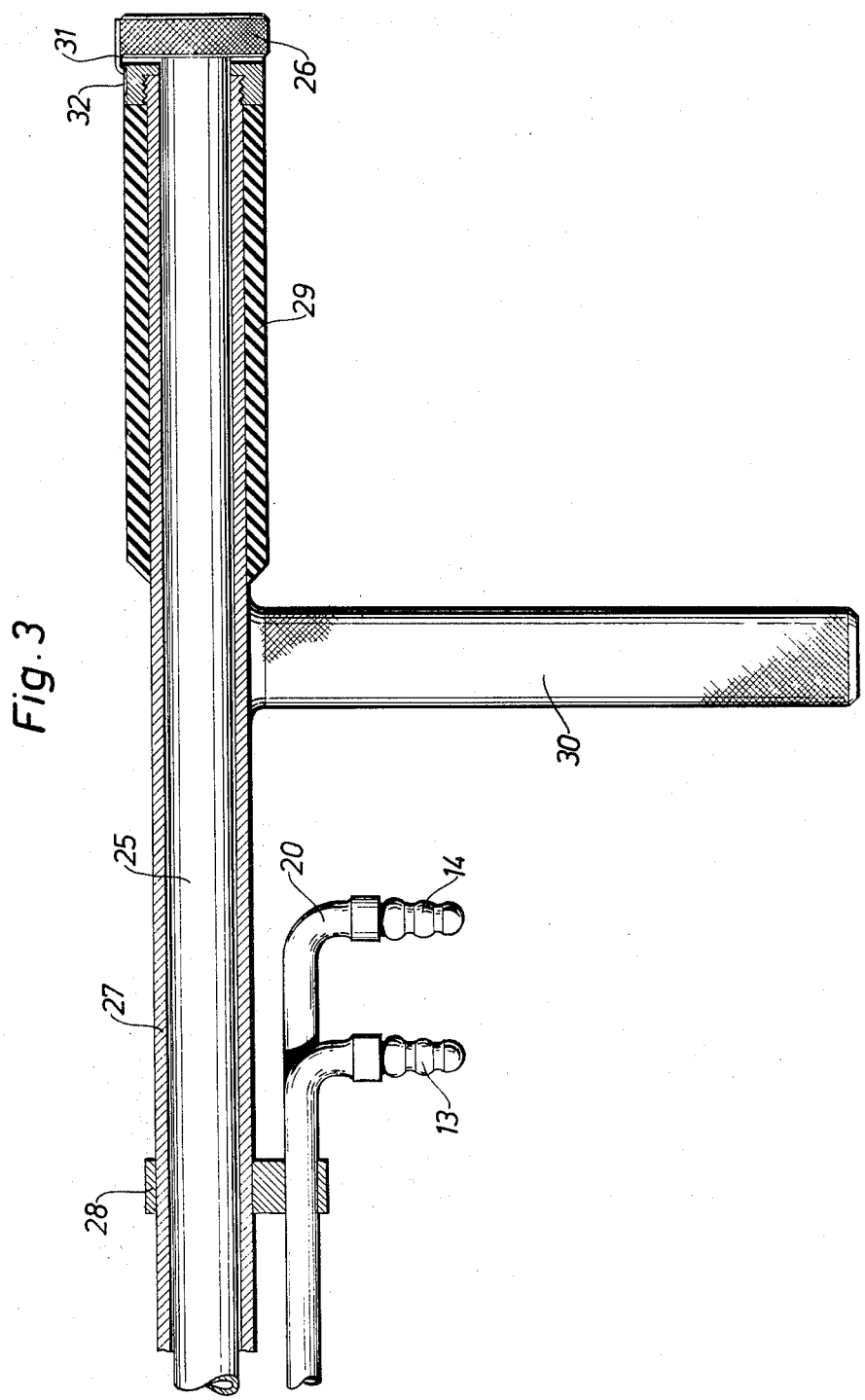

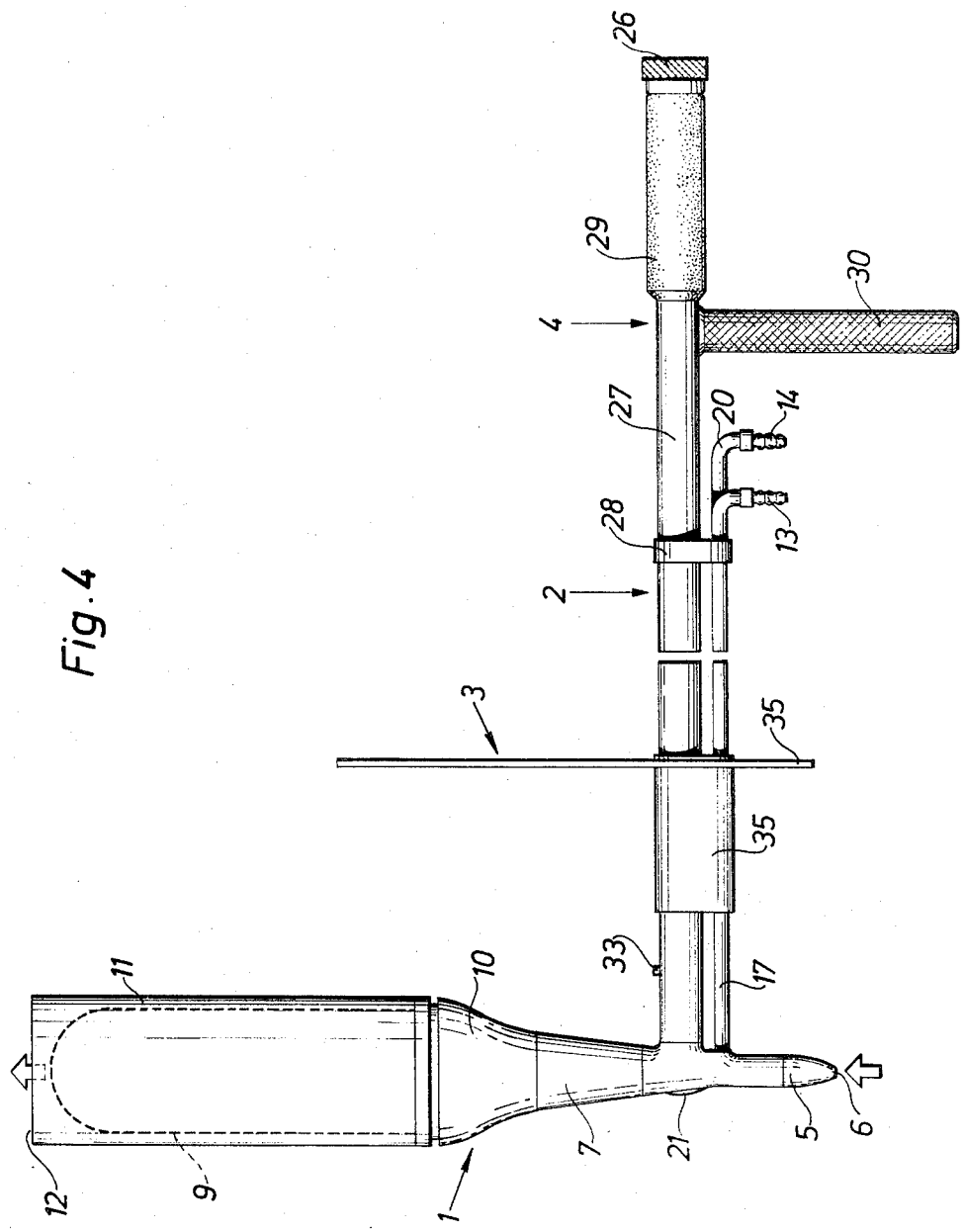

PARTICLE SAMPLING DEVICES

The present invention relates to a device for sampling particles from a flow of particle laden gas in a gas duct and having a front end portion which is arranged to be inserted into the gas duct when taking the sample.

For the purpose of determining particle concentrations and obtaining representative particle samples from streams of particle-laden gas it is normal practice to remove a part of the gas flow by suction and filter it through a sampling device or probe, the part gas flow being adjusted so that the speed at the nose of the probe coincides with the rate of flow of the gas in the duct from which the sample is taken, so called isokinetic suction.

It is known to check and control the isokinetic flow by measuring a static pressure in the duct and a static pressure in the probe, the criterion for isokinesia being that these pressures are equal.

When determining the particle concentration, it is necessary to establish the flow rate of the gas from which the particle sample is being filtered. This can be effected by separately measuring the dynamic pressure at the point where the part flow is removed by suction, or by means of a flow meter placed behind the means for filtering out the part gas flow through the sampling device. The isokinesia is often checked by taking the two measurements in parallel, so-called velocity probe. With such devices it is normal practice to activate the part gas flow by means of a suction pump arrangement or ejector means placed behind the filter. If these devices are placed externally of the duct through which the gas travels, it is often necessary to provide means for heating, cooling, removing condensation and drying the equipment and the part gas flows respectively when the gases being processed are hot and moist. Such apparatus is bulky, expensive and time consuming in operation. Corrections to the flow and velocity measurements must be made for changes in temperature, pressure and water content of the gas.

Apparatus for filtering and measuring the flow rate inside the gas ducts with components working at the prevailing gas temperature have therefore been proposed in the Swedish patent 346,382 granted Oct. 12, 1972.

It is also known to use the pressure differences occurring in the flow of gas in the gas duct from where the sample is to be taken as a means for activating the part gas flow, instead of using a separate drive source, although in this instance the use of particle sample separating means operating with a constant pressure drop, e.g. cyclone separators, has been recomended. Such separating devices, however, do not completely separate the dust from the gas. Thus, in these instances the sample is not representative and often lacks the most important fraction of fine particles.

The object of the present invention is to provide a simple means for sampling particles from a particle-laden gas flow in a duct which will measure the sample reliably and which is not encumbered with the aforementioned disadvantages.

This object is achieved by means of the device according to the invention, which is mainly characterized in that the front end portion comprises a through-flow body through which extends a diffusor-shaped channel and which can be oriented in the gas duct with the longitudinal axis of the diffusor channel in the flow direction of the gas therethrough, said diffusor channel extending from a nose portion provided with an inlet opening facing the direction in which the gas flows, the inlet opening being arranged to take in a part gas flow and lead the same through the diffusor channel to a screen filter arranged to the downstream end of the through-flow body and through which filter the part gas flow is arranged to return to the gas duct, a valve which can be adjusted during the sampling operation being arranged in the diffusor channel, and in that two channels are arranged in connection with measuring outlets located on a portion which during the sampling operation is positioned externally of the gas passage, of which two channels one communicates with the diffusor channel between the inlet opening of the nose portion and the valve for measuring the static pressure of the part gas flow when the valve is in a position such as to permit a part gas flow to pass therethrough, and the second communicates with an opening for measuring the static pressure in the gas duct.

The invention will now be described with reference to an embodiment thereof illustrated in the accompanying drawing, of which FIG. 1 is a sectional view through one end of the device, said end being intended to be inserted in the gas duct from which the sample is to be taken.

FIG. 3 illustrates, partly in section, the means for operating the device, said means being located at the end opposite to the end illustrated in FIG. 1.

FIG. 4 is a total view of the device according to the invention.

As will be seen from FIG. 4, the device comprises a probe having a front end portion 1 intended to be inserted in the gas duct, a shank or intermediate portion 2 which has slideably arranged thereon a connecting means 3 arranged for movement into sealing connection with an opening in the wall of the gas duct, and a rear end portion 4 for operating the probe.

Figure 1:
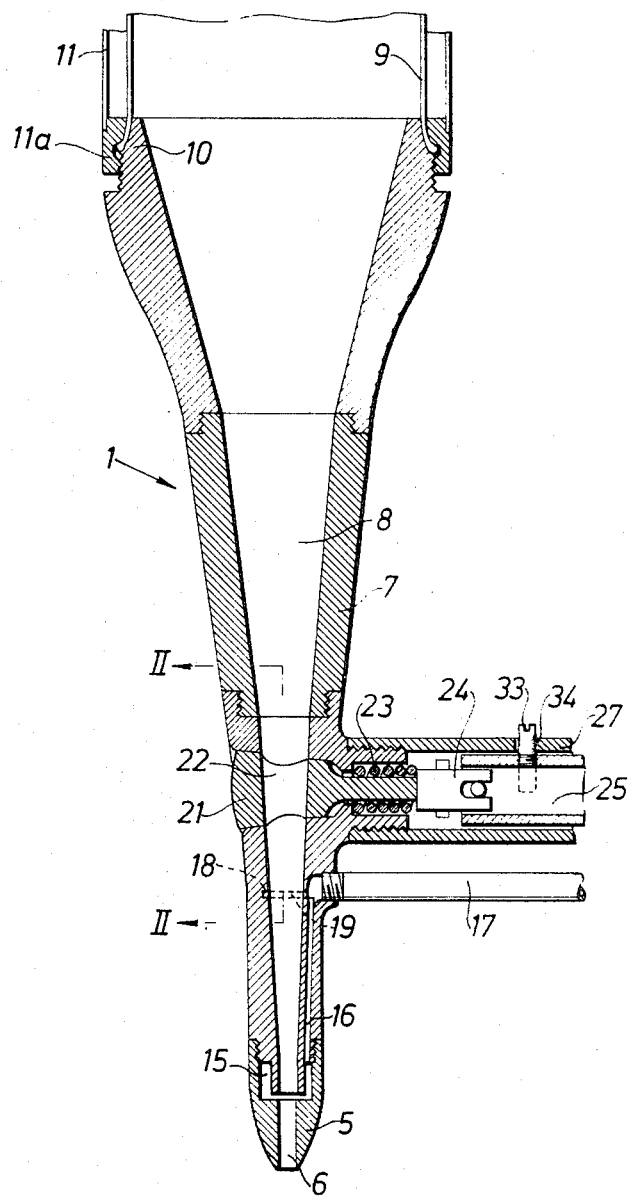

As will be seen from FIG. 1, the front end portion 1 has a nose portion 5 provided with an inlet opening 6 intended to be pointed in the direction of flow of gas through the duct, so as to collect a part gas flow for sampling purposes.

The nose 5 is arranged on a body member 7 through which the gas removed from the main stream flows, the body member being suitably composed of several parts. The body member 7 is mounted on the end of the shank or intermediate portion 2 and together with the nose 5 forms a soft streamline outer profile for the passing gas flow in the duct in which the sample is taken. Arranged in the through-flow body 7 is a precisely dimensioned diffusor channel 8 leading from the inlet opening 6 of the nose 5 to the opposite end of the body member 7 at which it is connected to a filter means 9 and adapted to convert a significant portion of the Kinetic energy sensed at the opening of the nose 5 into static pressure, for conveying the part gas flow through the filter means.

The filter means 9 comprises a bag of straining filter material, the rim of the opening of which bag is capable of being attached around an end portion 10 of the through-flow body 7. Arranged in spaced relationship around the filter bag is a discharge tube 11 for the filtered part flow of gas, the tube 11 being arranged so that its outer surface coincides with the outer profile of the through-flow body and discharges at a point beyond the bottom of the filter bag through an outlet 12 (FIG. 4) opposite the inlet opening 6 of the nose 5. The outlet tube 11 is attached to the through-flow body 7 by means of a clamping ring 11a arranged at one end of the body, the clamping ring simultaneously clasping the rim of the filter bag and holding it in position.

Figure 2:
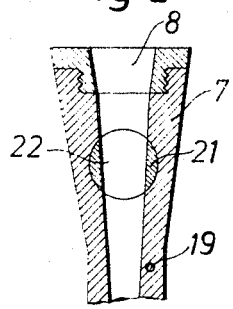
FIG. 2 is a part section taken through the line II — II in FIG. 1.

The through-flow body 7 is also provided with measuring outlets 13, 14 in the form of hose nipples arranged at the operating end of the device (FIGS. 3 and 4), the outlets being arranged for measuring the static pressure in the interior of the nose 5 and in the gas duct in which the sample is taken. For this purpose, an annular chamber 15 (FIG. 1) is arranged in connection transversally of the connecting point between the opening 6 of the nose 5 and the beginning of the diffusor channel 8 in the through-flow body 7, and is connected by means of a channel 16 in the body with a tube 17 located along the shank or intermediate portion 2, the tube 17 being provided with one of the aforementioned measuring outlets 13, for measuring the static pressure in the nose 5. In a similar manner, an opening 18 disposed in an outer wall of the through-flow body contacted by the gas flow in the gas duct communicates via a channel 19 (FIG. 1 and 2) with a tube 20 which extends parallel with the tube 17 and discharges in the measuring outlet 14 for measuring the static pressure in the gas duct in which the sample is taken.

Arranged in the diffusor channel 8 of the through-flow body is a valve 21 (FIGS. 1 and 2) in the form of a cock, the through-flow opening 22 of which is arranged to form a practically resistance-free passage when the valve is fully open, the wall of said passage fully conforming with the pressure-converting configuration of the diffusor channel. The valve is located at the position where the shank or intermediate portion 2 is connected to the through-flow body 7. The valve body of the valve 22 is frustoconical in shape and is arranged in a seating of corresponding configuration and caused to sealingly about the seating by means of a spring 23. The valve body is connected by means of a coupling element 24 to a tubular operating rod 25 arranged in the portion 2 and intended for rotating the valve body by means of an operating knob 26 at the rear end of the device.

The shank or intermediate portion 2 has an outer portion in the form of a tube 27 which is securely screwed to the through-flow body 7 and which encloses the operating rod 25 and has located on its outer surface a support member 28 for the measuring tubes 17 and 20 extending parallel with the shank 2. The tube 27 is provided at the operating end with a longitudinally extending grip 29 and a radially outwardly projecting handle 30.

The operating knob 26 (FIG. 3) is provided with an indicator means 31 co-operating with a scale 32 to enable the setting position of the valve to be read off. Arranged on the operating rod 25 is a peg 33 (FIG. 1) intended to co-operate with a slot 34 disposed circumferentially of the tube 27 to restrict the extent to which the valve can be rotated to predetermined working limits, between a fully open and a fully closed end position.

The connecting means 3 arranged for slidable movement on the shank portion 2 (FIG. 4) comprises a runner 35 which surrounds the tube 27 and the two measuring tubes 17 and 20, and a plate 36 carried by the runner and intended to be brought into sealing abutment against the side of the duct, in an opening disposed in the duct in which the sample is to be taken, or to the end flange of a connecting pipe located in the side of the duct. In this latter instance, the plate 3 is fixed momentarily to support the device in its entirety whilst the sample is being taken. When the length of the shank or intermediate portion permits, the slidability of the sampler on the shank enables it to be traversed across the whole width of the gas passage.

The method by sampling and the mode of operation of the valve is as follows:

1. With the valve closed, the probe is inserted in the duct without a sample being taken and without gas flowing into the probe and through the filter, so as to adjust the temperature of the probe to the temperature of the gas.

2. With the valve closed, measuring devices are connected to the outlets 13 and 14 to enable the probe to be used as a Prandtl tube, so that the difference between the static pressure in the gas duct and the total pressure acting in the nose of the probe can be measured. The dynamic pressure at the point where the sample is taken can be read immediately prior to taking the sample. Naturally, corresponding readings in this respect can be taken at later stages by closing the valve to cause short interruptions in the sampling process, and also immediately a sample has been taken.

3. When the valve is opened in order to take a sample, the static pressure differences between the outer gas duct and the gas flowing through the interior of the probe is measured. If the pressure difference is zero velocity coincidence exists in the nose of the probe, and the valve can thus be regulated by means of the operating knob to adjust and maintain velocity coincidence, said valve being opened progressively during the sampling operation to maintain the pressure difference at zero despite the increasing filter resistance. Sampling can be continued until the valve is fully open, whereupon it must be interruped since velocity coincidence can no longer be maintained at the nose. The valve is then closed and the filter is shielded to prevent further particles from collecting thereon.

All the measuring values for the sampling operation can be obtained by also measuring the time during which the valve is held open, by weighing the filter before and after the sampling operation, and by measuring the temperature in the gas duct. The rate of flow of the gas in the duct and the probe can be established by measuring the dynamic pressure and respective cross-sectional areas. The particle concentration can be established by dividing the quantity of particles collected on the filter by the flow through the probe. The particle sample is representative as a result of continuous controlled velocity coincidence.

Thus, the described device requires no external driving sources for the flow of gas through the probe, and neither does it require means for heating, cooling and separating condensation therefrom.

The invention is not restricted to the illustrated and described embodiment, but can be varied within the scope of the following claims.

I claim:

1. A device for taking a sample of particles from flow of gas in a gas duct and provided with a front end portion which is intended to be inserted in the gas duct during the sampling operation, characterized in that the front end portion comprises a through-flow body through which extends a diffusor-shaped channel and which can be oriented to the gas duct with the longitudinal axis of the diffusor channel parallel to the flow direction of the gas therethrough, said diffusor channel extending from a nose portion of said front end portion provided with an inlet opening facing the gas flow, the inlet opening being arranged to take in a part of said gas flow in said duct, said part gas flow passing through the diffusor channel to a screen filter on the downstream end of the through-flow body and through which filter the part gas flow is returned to the gas duct, an adjustable valve in the diffusor channel for controlling the velocity of the part gas flow in the diffusor channel, and two channels connected with two measuring outlets located on a portion of said device which during the sampling operation is positioned externally of the gas passage, one of said two channels providing communication between one of said outlets and an opening to the diffusor channel located between the inlet opening of the nose portion and the valve for measuring the static pressure of the part gas flow through said diffusor channel, and the second of said two channels providing communication between an opening in said front portion with the gas flow in said gas duct and the other of said measuring outlets for measuring the static pressure in the gas duct.

2. A device according to claim 1, characterized in that the valve comprises a cock inserted transversely to the diffusor channel and having a through-flow opening defined by the wall of the valve body which approximately conforms to the configuration of the diffusor channel, the cock having a first position forming a practically resistance free passage for the part gas flow when the valve is fully open the cock being rotatable to a second position wherein said cock interrupts said part gas flow through said diffusor channel, the valve being continuously adjustable between said first and second positions.

3. A device according to claim 2, including valve control means located on the portion located externally of the gas duct when a sample is being taken.

4. A device according to claim 1 wherein the portion positioned externally of the gas duct comprises a tubular shank member carrying the through-flow body and supporting means for adjusting said valve from a location external to said gas duct.

5. A device according to claim 4, characterized in that the tubular member encloses an operating rod coupling a knob located on the external end of the tubular member and the valve so that the valve can be adjusted by rotating the knob.

6. A device according to claim 5, including a scale and an indicator means mechanically linked with the knob to allow the setting position of the valve to be read off.

7. A device according to claim 5 characterized in that the valve is located at the point where the tubular shank member is connected to the through-flow body, the cock of the valve having an axis of rotation in the longitudinal axis of the operating rod and being connected to the operating rod in non-rotational relationship.

8. A device according to claim 1 characterized in that the screen filter is in the form of a bag, the rim of said bag being secured around the down-stream end of the through-flow body, said bag being encircled in spaced relationship by a tube terminating the through-flow body and provided with an outlet opening for the part gas flow received in the diffusor channel from the inlet opening of the nose portion.

9. A device for taking a sample of particles from a flow of gas in a gas duct and including a handle, a front portion carried on said handle for insertion in said gas duct in the sampling operation, said front portion including a nose portion having an inlet opening for facing the gas flow, a through flow body through which extends a diffusor shaped channel extending from said inlet opening to a screen filter coupled to the downstream end of said through flow body, and a valve including a cock inserted transversely in said diffusor channel and having an axis of rotation perpendicular to said fiffusor channel and parallel to said handle, said handle carrying an operating rod parallel to said valve cock rotation axis and connected between said valve cock and an operating knob on said handle for varying said cock between a first position providing no resistance to gas flow through said diffusor channel and a second position closing said diffusor channel to said gas flow, said handle further supporting a first tube having an inlet in said diffusor channel between the inlet opening of said nose portion and said valve and an outlet providing a measure of static pressure of gas flow in said diffusor channel, and a second tube having an inlet in said front portion to said gas duct and an outlet providing a measure of static pressure in said gas duct.

* * * * *